United States Patent
Wojcik et al.

(10) Patent No.: US 11,976,937 B2
(45) Date of Patent: May 7, 2024

(54) METHOD AND SYSTEM FOR INTERPOLATION AND METHOD AND SYSTEM FOR DETERMINING A MAP OF A SURROUNDING OF A VEHICLE

(71) Applicant: Aptiv Technologies AG, Schaffhausen (CH)

(72) Inventors: Mateusz Wojcik, Cracow (PL); Mateusz Komorkiewicz, Cracow (PL); Filip Ciepiela, Cracow (PL); Daniel Dworak, Tarnów (PL)

(73) Assignee: Aptiv Technologies AG, Schaffhausen (CH)

( * ) Notice: Subject to any disclaimer, the term of this patent is extended or adjusted under 35 U.S.C. 154(b) by 210 days.

(21) Appl. No.: 17/474,988

(22) Filed: Sep. 14, 2021

(65) Prior Publication Data

US 2022/0099456 A1    Mar. 31, 2022

(30) Foreign Application Priority Data

Sep. 25, 2020 (EP) .................................... 20198317

(51) Int. Cl.
*G06K 9/00* (2022.01)
*G01C 21/00* (2006.01)
*G06T 3/4007* (2024.01)

(52) U.S. Cl.
CPC ........ *G01C 21/3837* (2020.08); *G06T 3/4007* (2013.01); *G06T 2207/30252* (2013.01)

(58) Field of Classification Search
CPC .............. G01C 21/3837; G06T 3/4007; G06T 2207/30252; G06T 1/0007; G06T 3/4053;
(Continued)

(56) References Cited

U.S. PATENT DOCUMENTS 6,771,811 B1 * 8/2004 Walmsley .............. H04N 1/486
                                                          382/167
10,395,144 B2    8/2019 Zeng et al.
(Continued)

FOREIGN PATENT DOCUMENTS

EP        3208635          8/2017

OTHER PUBLICATIONS

"Extended European Search Report", EP Application No. 20198317. 8, Feb. 24, 2021, 11 pages.
(Continued)

*Primary Examiner* — Dhaval V Patel
(74) *Attorney, Agent, or Firm* — Harness, Dickey & Pierce, P.L.C.

(57) ABSTRACT

A computer-implemented method for interpolation comprises the following steps carried out by computer hardware components: determining an image-like input data structure, the image-like input data structure comprising a plurality of data points; determining a plurality of reference data points as a subset of the plurality of data points of the image-like input data structure; determining an image-like temporary data structure based on the image-like input data structure and a pre-determined processing operation; replacing data points of the image-like temporary data structure corresponding to the plurality of reference data points by the plurality of reference data points to obtain an image-like updated temporary data structure; and determining an image-like output data structure based on the image-like updated temporary data structure.

16 Claims, 4 Drawing Sheets

(58) Field of Classification Search
CPC ............... G06T 3/4023; G06T 7/50; G06T 2207/10028; G06N 3/045; G06N 3/08
See application file for complete search history.

(56) References Cited

U.S. PATENT DOCUMENTS

| | | | | |
|---|---|---|---|---|
| 2003/0067553 | A1* | 4/2003 | Ritter | H04N 7/0125 348/E7.012 |
| 2007/0024614 | A1* | 2/2007 | Tam | H04N 13/282 348/E13.02 |
| 2009/0074328 | A1* | 3/2009 | Matsumoto | G06T 3/4007 382/300 |
| 2014/0313350 | A1* | 10/2014 | Keelan | H04N 23/843 348/188 |
| 2018/0130180 | A1* | 5/2018 | Wang | G06T 3/4046 |
| 2019/0026597 | A1* | 1/2019 | Zeng | G05D 1/0274 |

OTHER PUBLICATIONS

Caltagirone, et al., "Fast LIDAR-based Road Detection Using Fully Convolutional Neural Networks", Mar. 29, 2017, 6 pages.
Caltagirone, et al., "LIDAR-Camera Fusion for Road Detection Using Fully Convolutional Neural Networks", Sep. 21, 2018, 7 pages.
Chen, et al., "Progressive LiDAR Adaptation for Road Detection", Apr. 2, 2019, 11 pages.
Gu, et al., "Histograms of the Normalized Inverse Depth and Line Scanning for Urban Road Detection", Nov. 2018, 11 pages.
Han, et al., "Road detection based on the fusion of Lidar and image data", Nov. 2017, 10 pages.
Liang, et al., "Deep Continuous Fusion for Multi-Sensor 3D Object Detection", Jan. 1, 2018, 16 pages.
Lyu, et al., "ChipNet: Real-Time LiDAR Processing for Drivable Region Segmentation on an FPGA", Mar. 5, 2019, 11 pages.
Premebida, et al., "Pedestrian detection combining RGB and dense LIDAR data", Sep. 2014, 6 pages.
Shinzato, et al., "Road Terrain Detection: Avoiding Common Obstacle Detection Assumptions Using Sensor Fusion", Jun. 2014, pp. 687-692.
Wang, et al., "Fusing Bird's Eye View LIDAR Point Cloud and Front View Camera Image for Deep Object Detection", Feb. 14, 2018, 12 pages.
Xiao, et al., "CRF based Road Detection with Multi-Sensor Fusion", Jul. 2015, pp. 192-198.
Xiao, et al., "Hybrid Conditional Random Field based Camera-LIDAR Fusion for Road Detection", Aug. 2017, 27 pages.
Zhang, et al., "Road Detection through CRF based LiDAR-Camera Fusion", May 2019, pp. 3832-3838.

* cited by examiner

METHOD AND SYSTEM FOR INTERPOLATION AND METHOD AND SYSTEM FOR DETERMINING A MAP OF A SURROUNDING OF A VEHICLE

CROSS-REFERENCE TO RELATED APPLICATION

This application claims priority to European Patent Application Number 20198317.8, filed Sep. 25, 2020, the disclosure of which is hereby incorporated by reference in its entirety herein.

BACKGROUND

The present disclosure relates to methods and systems for interpolation and methods and systems for determining a map of a surrounding of a vehicle.

Digital imaging devices, such as digital cameras, are used in automotive applications for various purposes, like detecting the environment of vehicles, like roads or other vehicles, or the internal of the vehicle, like a driver or other passengers of the vehicle.

Images of different resolutions may be required for different tasks.

Accordingly, there is a need to convert images from one resolution to another resolution.

SUMMARY

The present disclosure provides a computer-implemented method, a computer system and a non-transitory computer readable medium according to the independent claims. Embodiments are given in the subclaims, the description and the drawings.

In one aspect, the present disclosure is directed at a computer-implemented method for interpolation, the method comprising the following steps performed (in other words: carried out) by computer hardware components: determining an image-like input data structure, the image-like input data structure comprising a plurality of data points; determining a plurality of reference data points as a subset of the plurality of data points of the image-like input data structure; determining an image-like temporary data structure based on the image-like input data structure and a pre-determined processing operation; replacing data points of the image-like temporary data structure corresponding to the plurality of reference data points by the plurality of reference data points to obtain an image-like updated temporary data structure; and determining an image-like output data structure based on the image-like updated temporary data structure.

Interpolation may be understood as determining pixels between reference pixels. Interpolating may be used to increase or reduce (spatial) resolution of an image or determining pixels between reference pixels. The (spatial) resolution of the image-like output data structure may be higher than/lower than/or equal to the (spatial) resolution of image-like input data structure. It will be understood that (spatial) resolution may refer to the number of data points.

According to another aspect, the image-like input data structure represents a matrix comprising the plurality of data points. Likewise, the image-like temporary data structure and/or the image-like output data structure may represent a matrix comprising a plurality of data points. The matrix may be a grid-like data structure.

According to another aspect, the image-like input data structure comprises at least one of an image or a map. The image may be a visual image, and a data point may corresponds to (or may be) a pixel. The map may be an altitude map or a depth map, and a data point may correspond to (or may be) an entry in the map.

According to another aspect, the image-like input data structure may be sparse. Likewise, the image-like temporary data structure and/or the image-like output data structure may be sparse. In other words, an image-like data structure may be a sparse image-like data structure, a sparse image-like input data structure, a sparse image-like temporary data structure, a sparse image-like output data structure, or the like.

Sparse may mean that the data is explicitly stored for data points with a value different from 0 (but may also include data points with value of 0), and all other data points (i.e. data points for which a value is not explicitly stored) are (implicitly) given as 0.

According to another aspect, the reference data points are data points explicitly provided in the sparse representation.

Using the data points explicitly provided in the sparse representation (i.e. data points which are not implicitly given as 0) may ensure that the data points that have the biggest influence on the reference data are used for the interpolation.

According to another aspect, the following steps are carried out by the computer hardware components as repeated processing in a plurality of iterations: determining an image-like temporary data structure of the present iteration based on the image-like updated temporary data structure of the previous iteration and the pre-determined processing operation; and replacing data points of the image-like temporary data structure of the present iteration corresponding to the plurality of reference data points by the plurality of reference data points to obtain an image-like updated temporary data structure of the present iteration.

Replacing data points of the image-like temporary data structure of the present iteration corresponding to the plurality of reference data points by the plurality of reference data points may provide that the image-like updated temporary data structure of the present iteration is identical to the image-like input data structure at least at the plurality of reference data points.

According to another aspect, the repeated processing is stopped when a stop criterion is met, and the latest image-like temporary data structure is determined as the image-like output data structure.

According to another aspect, the stop criterion is based on at least one of a time available for determining the image-like output data structure, a number of iterations in the repeated processing, or an accuracy of the image-like output data structure. The accuracy may be directly proportional to the number of loop iterations. The stop criterion as a time limit may be set to the maximum value for which the time of whole processing (i.e. the time for evaluating the CNN plus the time for the necessary projections plus the time for the interpolations) can still be treated as a real-time. An alternative approach may be to measure differences in subsequent image-like output data structures and stop once a defined threshold is not met (in other words: once the image-like output data structures do not significantly change from one iteration to the next iteration).

According to another aspect, the pre-determined processing operation comprises at least one of average pooling (for example 2D (two-dimensional) average pooling), max pooling (for example 2D max pooling), min pooling (for example 2D min pooling), or convolution (for example 2D convolution).

It has been found that using one or more of these operations as pre-determined processing operation enhances the results.

In another aspect, the present disclosure is directed at a computer-implemented method for determining a map of a surrounding of a vehicle, the method comprising the following steps carried out by computer hardware components: determining distance-related data; determining an image-like input data structure based on the distance-related data; determining interpolated data based on the image-like output data structure determined based on the method for interpolation as described herein; and determining the map of the surrounding of the vehicle based on the interpolated data.

The distance-related data may be lidar data (for example a lidar point cloud) or radar data, or any other kind of information which indicates distance data or from which distance information may be obtained.

It has been found that using the method for interpolation as described herein provides good results when used in determination of a map.

According to another aspect, the image-like input data structure is determined based on a camera plane projection of the distance-related data. As such, the distance-related data and the camera data may be aligned.

According to another aspect, the computer-implemented method further comprises the following step carried out by the computer hardware components: determining intermediate data based on an artificial neural network and based on the interpolated data; wherein the map of the surrounding of the vehicle is determined based on the intermediate data.

The intermediate data may include or may be a 2D camera map of probabilities; and may further include a BEV (bird's-eye view) projection.

According to another aspect, the computer-implemented method may further comprise the following step carried out by the computer hardware components: acquiring an image related to the surrounding of the vehicle; wherein the intermediate data is determined further based on the image. The image may be an RGB image.

In another aspect, the present disclosure is directed at a computer system, said computer system comprising a plurality of computer hardware components configured to carry out several or all steps of the computer-implemented method described herein.

The computer system may comprise a plurality of computer hardware components (e.g., a processor, processors, a processing unit, a processing network, a memory, a memory unit, a memory network, non-transitory data storage). It will be understood that further computer hardware components may be provided and used for carrying out steps of the computer-implemented method in the computer system. For example, a non-transitory data storage and/or a memory unit may comprise a computer program for instructing the computer to perform several or all steps or aspects of the computer-implemented method described herein, for example using a processing unit and at least one memory unit.

In another aspect, the present disclosure is directed at a vehicle including the computer system.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

With the methods and systems according to various embodiments, an efficient system architecture including an efficient interpolation module may be provided, which may be transformed to an embedded real-time system.

BRIEF DESCRIPTION OF THE DRAWINGS

Exemplary embodiments and functions of the present disclosure are described herein in conjunction with the following drawings, showing schematically.

DETAILED DESCRIPTION

A freespace area (which may also be referred to as driveable area) may be a part of a road which is not occupied by any object and is reachable by car. Detecting a freespace area is an important activity that needs to be solved accurately and robustly in order to achieve higher vehicle automation levels. Knowing what regions of the road surface are available for driving is in fact a crucial prerequisite for carrying out safe trajectory planning and decision-making.

According to various embodiments, an efficient NN (neural network) based low-level camera-lidar fusion system for driveable area determination is provided, which may contain various components, which will be described in more detail herein.

Figure 1:
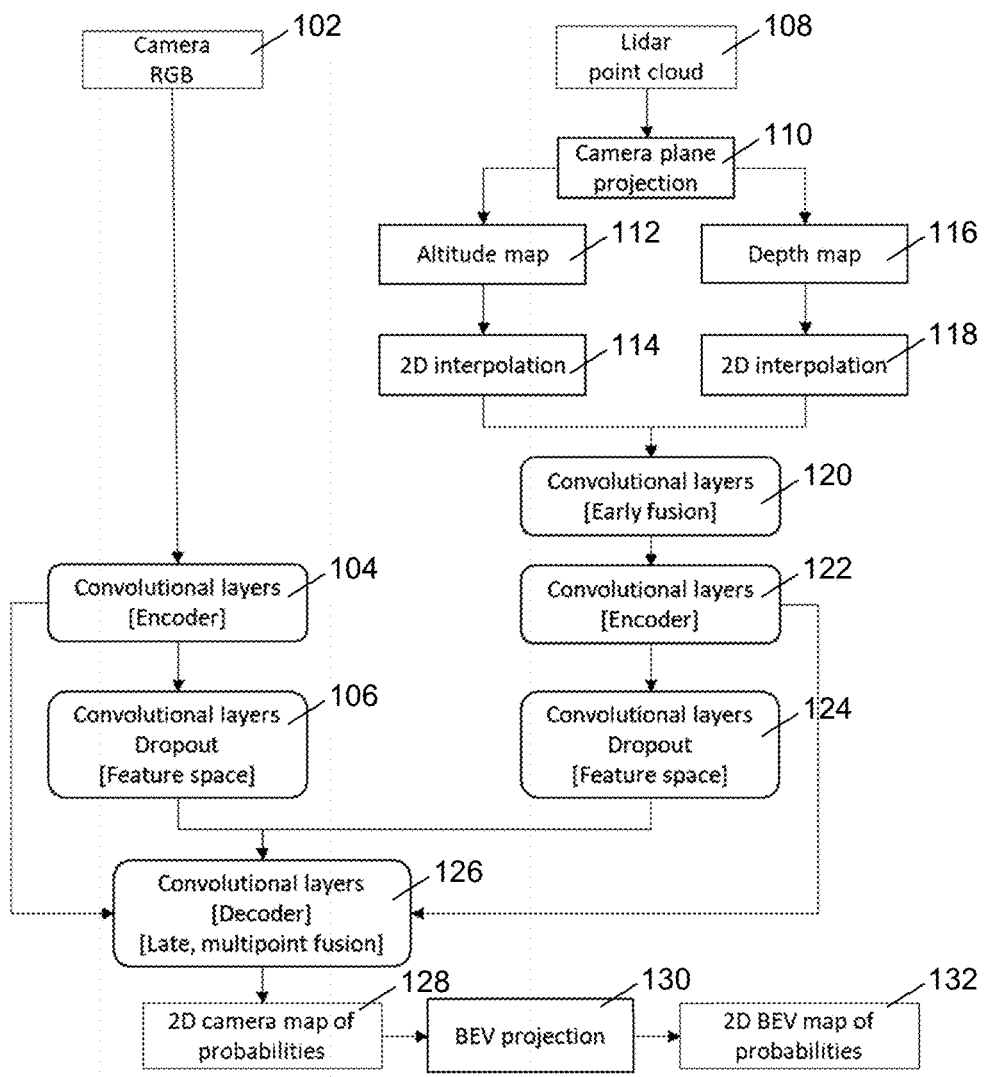
FIG. 1 a neural network based camera-lidar fusion system according to various embodiments FIG. 2 a flow diagram illustrating a method for interpolation according to various embodiments.

FIG. 1 shows a neural network based camera-lidar fusion system 100 according to various embodiments.

The system 100 may include (or may be) a fully convolutional neural network (CNN) having the following layers: Encoders (for example convolutional layers 104 and 122), feature spaces (for example convolutional layers with optional dropout 106 and 124), a decoder (for example convolutional layers 126, for example for late multipoint fusion), a block 110 for camera plane projection (for example using calibration data) and modules 114 and 118 for 2d interpolation.

Lidar point cloud data 108 may be acquired, which may then be projected onto a camera plane and limited to camera view boundaries (for example using the camera plane projection module 110). Based on the projected data, two separate images may be created: an altitude map 112 and a depth map 116. Both maps may be sparse, and thus may be converted to a dense form by using a 2-d interpolation method according to various embodiments, for example as described in Table 1. For example, a 2D interpolation 114 of the altitude map 112 may be obtained, and a 2D interpolation 118 of the depth map 118 may be obtained.

The 2D interpolation 114 of the altitude map 112 and the 2D interpolation 118 of the depth map 118 may then be fed into a CNN where the first processing layers (which may be convolutional layers 120) may be responsible for their fuse (or fusion) by the means of concatenation and 2D convolution (for example providing early fusion).

The CNN may have a further input, by which camera data 102 (for example raw camera RGB (red-green-blue) image data) may be provided to the CNN.

Both branches of the CNN (the lidar branch and the camera branch) may have convolutional layers to encode images (for example using 2D convolution and 2D max pooling) and output a large number of feature maps in the next 2D convolutions (wherein the feature maps may be understood to be provided in the feature space). During CNN training, dropout layers may be active in the feature spaces (in other words: dropout layers related to the convolutional layers 106, 124 may be active). For example, the lidar branch of the neural network may include the convolutional layers 122 which may form an encoder, and may further include the convolutional layers 124 which may provide the feature maps. For example, the camera branch of the neural network may include the convolutional layers 104 which may form an encoder, and may further include the convolutional layers 106 which may provide the feature maps.

The CNN may end with a decoder part where both encoders and feature spaces are fused by the means of concatenation and 2D convolution (for example providing late fusion, for example by convolutional layers 126). The network may produce a 2D map of probabilities 128 which may be projected (for example using a BEV projection module 130) into bird's-eye view, which may be the system output and may be a 2D BEV map of probabilities 132.

The fully convolution neural network according to various embodiments may be optimized to match real-time processing. The 2-d interpolation according to various embodiments has low complexity and it may fully be based on GPU based operation. Furthermore, the interpolation method (or the interpolation module) may be provided in a parallelized manner, so that the processing may be scaled to match client requirements of real-time processing for new high-resolution cameras and lidars.

The lidar branch (122, 124) and the camera branch (104, 106) of the CNN may be trained separately and may be treated as independent systems. Those branches may then be combined and fine-tuned together. In this approach, good performance of the separate lidar and camera systems may guarantee robustness of the whole fusion system.

In an alternative approach, the lidar branch (122, 124) and the camera branch (104, 106) of the CNN may be trained in a common training.

For example, the method may provide an efficient neural network based low-level camera-lidar fusion system for driveable area determination.

An pseudo-code representation of the interpolation method is provided in Table 1 below.

TABLE 1

GPU (graphics processing unit) based 2D interpolation of sparse irregular images according to various embodiments.

Figure 2:
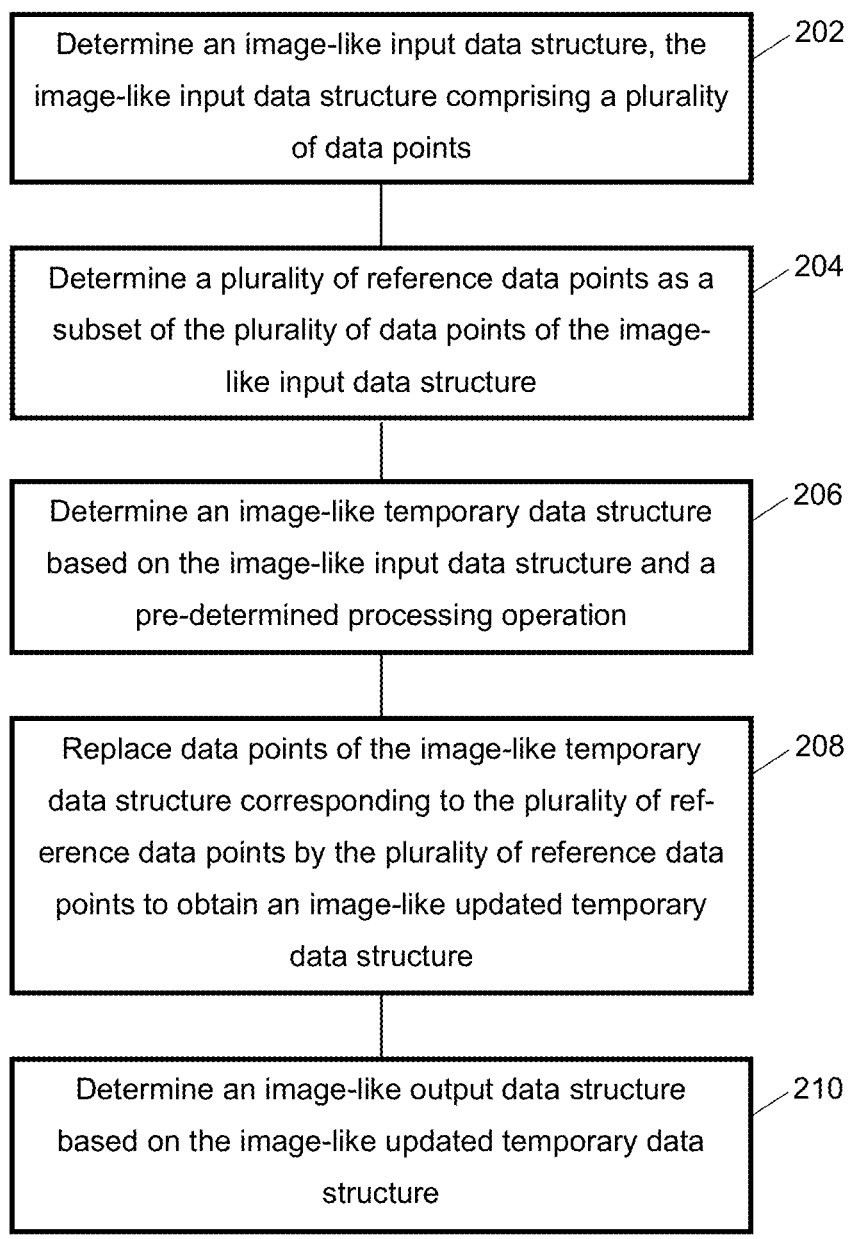

INPUT:
Image—matrix like structure, containing original valid image pixels
ImageMask—binary mask which identifies valid image pixel positions
OUTPUT:
ResultImage—matrix like structure, containing both original valid and interpolated image pixels
1. Keep original Image values as OriginalImage
2. While time limit is not exceeded:
  a. Make a temporary image TmpImage by applying the following operations: 2D-AveragePooling, 2D-MaxPooling, 2D-MinPooling, 2D-Convolution (one or a combination of them)
  b. Override selected TmpImage pixels by applying values of valid pixels from original image—using ImageMask and OriginalImage
3. Set ResultImage as TmpImage FIG. 2 shows a flow diagram 200 illustrating a method for interpolation according to various embodiments. At 202, an image-like input data structure may be determined, wherein the image-like input data structure comprises a plurality of data points. At 204, a plurality of reference data points may be determined as a subset of the plurality of data points of the image-like input data structure. At 206, an image-like temporary data structure may be determined based on the image-like input data structure and a pre-determined processing operation. At 208, data points of the image-like temporary data structure corresponding to the plurality of reference data points may be replaced by the plurality of reference data points to obtain an image-like updated temporary data structure. At 210, an image-like output data structure may be determined based on the image-like updated temporary data structure.

According to various embodiments, the image-like input data structure may represent a matrix comprising the plurality of data points. According to various embodiments, the image-like input data structure comprises at least one of an image or a map. According to various embodiments, the image-like input data structure may be sparse.

According to various embodiments, the reference data points may be data points explicitly provided in the sparse representation.

According to various embodiments, the following steps may be carried out by the computer hardware components as repeated processing in a plurality of iterations: determining an image-like temporary data structure of the present iteration based on the image-like updated temporary data structure of the previous iteration and the pre-determined processing operation(s); replacing data points of the image-like temporary data structure of the present iteration corresponding to the plurality of reference data points by the plurality of reference data points to obtain an image-like updated temporary data structure of the present iteration.

According to various embodiments, the repeated processing may be stopped when a stop criterion is met, and the latest image-like temporary data structure is determined as the image-like output data structure.

According to various embodiments, the stop criterion may be based on at least one of a time available for determining the image-like output data structure, a number of iterations in the repeated processing, or an accuracy of the image-like output data structure.

According to various embodiments, the pre-determined processing operation may include or may be at least one of average pooling, max pooling, min pooling, or convolution.

According to various embodiments, a method for determining a map of a surrounding of a vehicle may be provided.

The method may include: determining distance-related data; determining an image-like input data structure based on the distance-related data; determining interpolated data based on image-like output data structure determined based on the (interpolation) method described above; and determining the map of the surrounding of the vehicle based on the interpolated data.

According to various embodiments, the image-like input data structure may be determined based on a camera plane projection of the distance-related data.

According to various embodiments, intermediate data may be determined based on an artificial neural network and based on the interpolated data; wherein the map of the surrounding of the vehicle is determined based on the intermediate data.

According to various embodiments, an image related to the surrounding of the vehicle may be acquired, wherein the intermediate data is determined further based on the image.

Each of the steps 202, 204, 206, 208, 210 and the further steps described above may be performed by computer hardware components.

The interpolation as described above may be applied for processing the Lidar point cloud in the camera plane.

However, it will be understood that the interpolation method may be used for other applications, for example any applications where an interpolation of irregular grid/images is needed.

The interpolation method may reduce computation time.

Figure 3:
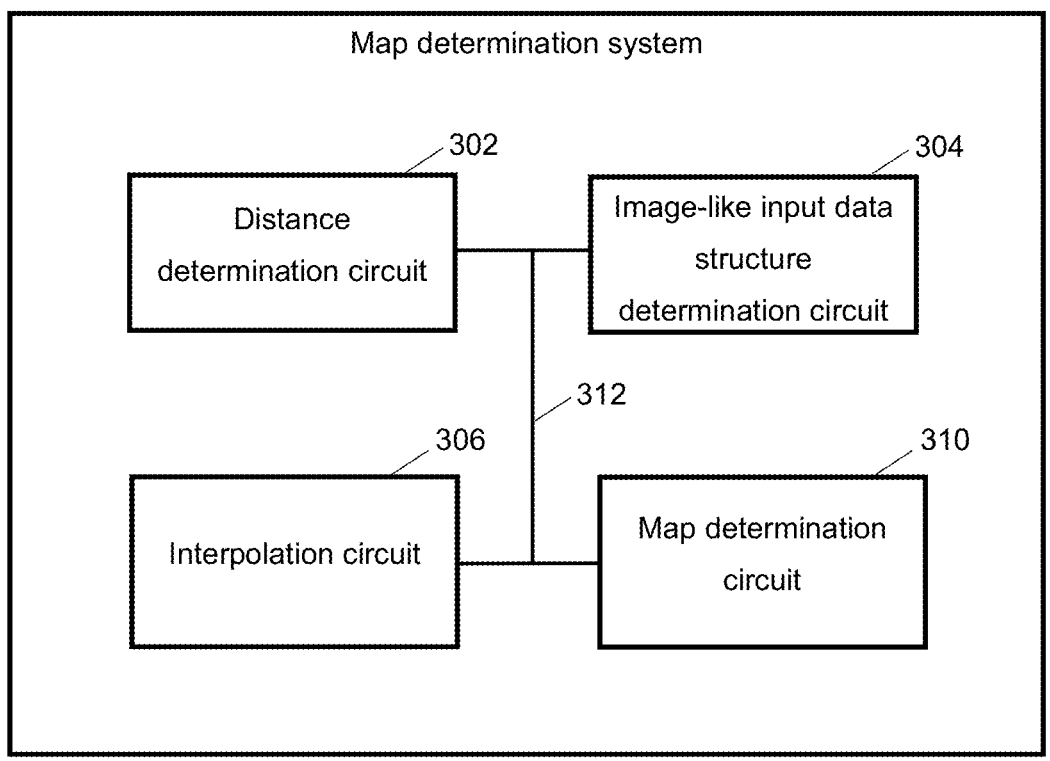
FIG. 3 a map determination system according to various embodiments.

FIG. 3 shows a map determination system 300 according to various embodiments. The map determination system 300 may include a distance determination circuit 302, an image-like input data structure determination circuit 304, an interpolation circuit 306, and a map determination circuit 308.

The distance determination circuit 302 may be configured to determine distance-related data.

The image-like input data structure determination circuit 304 may be configured to determine an image-like input data structure based on the distance-related data.

The interpolation circuit 306 may be configured to determine interpolated data based on the image-like output data structure determined based on the above described method for interpolation.

The map determination circuit 308 may be configured to determine the map of the surrounding of the vehicle based on the interpolated data.

The distance determination circuit 302, the image-like input data structure determination circuit 304, the interpolation circuit 306, and the map determination circuit 308 may be coupled with each other, e.g. via an electrical connection 310, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 4:
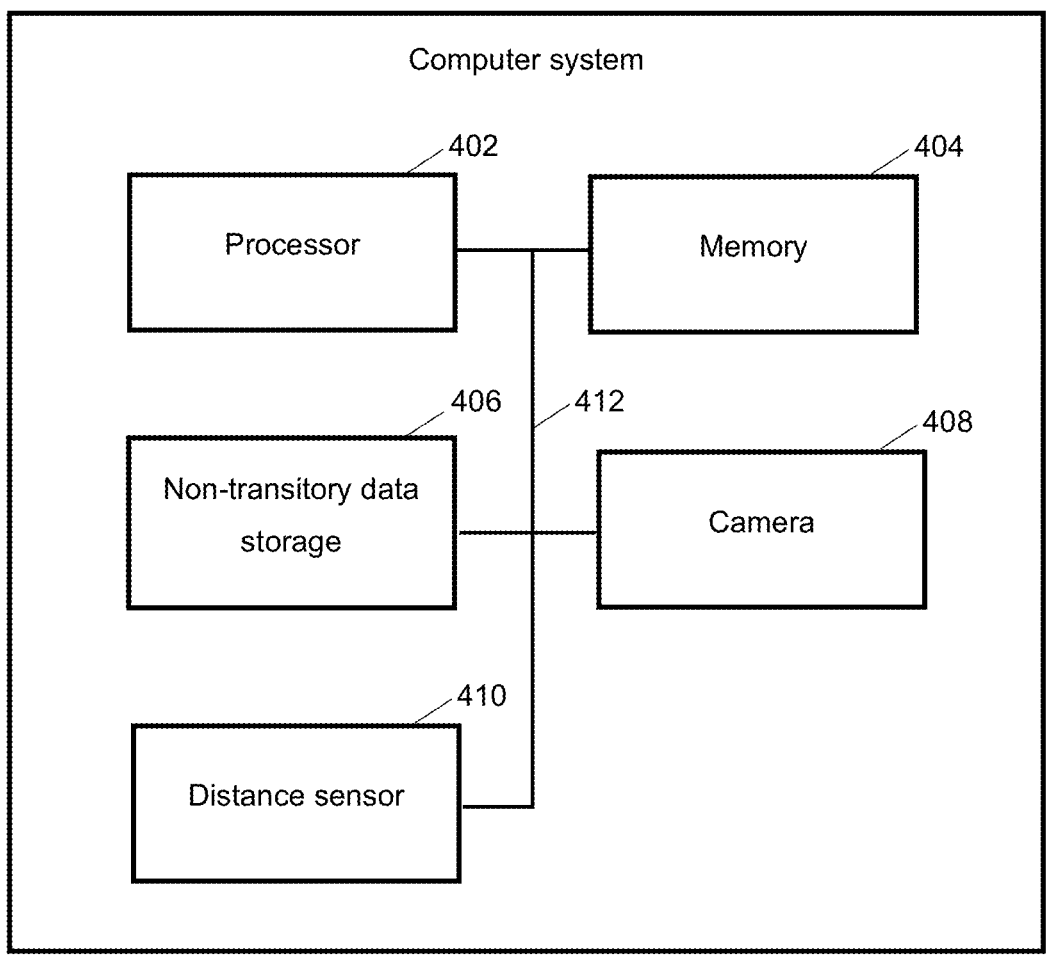
FIG. 4 a computer system with a plurality of computer hardware components configured to carry out steps of a computer implemented method for interpolation according to various embodiments or configured to carry out steps of a computer implemented method for determining a map of a surrounding of a vehicle according to various embodiments.

FIG. 4 shows a computer system 400 with a plurality of computer hardware components configured to carry out steps of a computer implemented method for interpolation according to various embodiments or configured to carry out steps of a computer implemented method for determining a map of a surrounding of a vehicle according to various embodiments. The computer system 400 may include a processor 402, a memory 404, and a non-transitory data storage 406. A camera 408 and/or a distance sensor 410 (for example a radar sensor and/or a lidar sensor) may be provided as part of the computer system 400 (like illustrated in FIG. 4), or may be provided external to the computer system 400.

The processor 402 may carry out instructions provided in the memory 404. The non-transitory data storage 406 may store a computer program, including the instructions that may be transferred to the memory 404 and then executed by the processor 402. The camera 408 and/or the distance sensor 410 may be used for determining distance-related data.

The processor 402, the memory 404, and the non-transitory data storage 406 may be coupled with each other, e.g. via an electrical connection 412, such as e.g. a cable or a computer bus or via any other suitable electrical connection to exchange electrical signals. The camera 408 and/or the distance sensor 410 may be coupled to the computer system 400, for example via an external interface, or may be provided as parts of the computer system (in other words: internal to the computer system, for example coupled via the electrical connection 412).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the map determination system 300 and/or for the computer system 400.

What is claimed is:

1. A method for interpolation, the method comprising:
   determining an image-like input data structure, the image-like input data structure comprising a plurality of data points;
   determining a plurality of reference data points as a subset of the plurality of data points of the image-like input data structure;
   determining an image-like temporary data structure based on the image-like input data structure and a pre-determined processing operation comprising the following steps as repeated processing steps in a plurality of iterations:
      determining an image-like temporary data structure of a present iteration based on an image-like updated temporary data structure of a previous iteration and the pre-determined processing operation;
      replacing data points of the image-like temporary data structure of the present iteration corresponding to the plurality of reference data points by the plurality of reference data points to obtain a latest image-like updated temporary data structure; and
      determining whether a time available for determining an image-like output data structure meets a stop criterion;
   stopping the repeated processing steps in response to determining that the time available for determining the image-like output data structure meets the stop criterion; and
   responsive to stopping the repeated processing steps, determining the image-like output data structure based on the latest image-like updated temporary data structure.

2. The method of claim 1, wherein the image-like input data structure represents a matrix comprising the plurality of data points.

3. The method of claim 1, wherein the image-like input data structure comprises at least one of an image or a map.

4. The method of claim 1, wherein:
the image-like input data structure is a sparse image-like input data structure; and
the reference data points are data points explicitly provided in the sparse image-like input data structure.

5. The method of claim 1, wherein the stop criterion is further based on at least one of a number of iterations in the repeated processing steps or an accuracy of the image-like output data structure.

6. The method of claim 1, wherein the pre-determined processing operation comprises at least one of average pooling, max pooling, min pooling, or convolution.

7. A method for determining a map of a surrounding of a vehicle, the method comprising:
determining distance-related data;
determining an image-like input data structure based on the distance-related data, the image-like input data structure comprising a plurality of data points;
determining a plurality of reference data points as a subset of the plurality of data points of the image-like input data structure;
determining an image-like temporary data structure based on the image-like input data structure and a pre-determined processing operation comprising the following steps as repeated processing steps in a plurality of iterations:
determining an image-like temporary data structure of a present iteration based on an image-like updated temporary data structure of a previous iteration and the pre-determined processing operation;
replacing data points of the image-like temporary data structure of the present iteration corresponding to the plurality of reference data points by the plurality of reference data points to obtain a latest image-like updated temporary data structure; and
determining whether a time available for determining an image-like output data structure meets a stop criterion;
stopping the repeated processing steps in response to determining that the time available for determining the image-like output data structure meets the stop criterion;
responsive to stopping the repeated processing steps, determining the image-like output data structure based on the latest image-like updated temporary data structure;
determining interpolated data based on the image-like output data structure; and
determining the map of the surrounding of the vehicle based on the interpolated data.

8. The method of claim 7, wherein the image-like input data structure is determined based on a camera plane projection of the distance-related data.

9. The method of claim 7, the method further comprising determining intermediate data based on an artificial neural network and based on the interpolated data, wherein the map of the surrounding of the vehicle is determined based on the intermediate data.

10. The method of claim 9, the method further comprising acquiring an image related to the surrounding of the vehicle, wherein the intermediate data is determined based on the image.

11. A computer system for determining a map of a surrounding of a vehicle, the computer system comprising one or more processors configured to:
determine distance-related data;
determine an image-like input data structure based on the distance-related data, the image-like input data structure comprising a plurality of data points;
determine a plurality of reference data points as a subset of the plurality of data points of the image-like input data structure;
determine an image-like temporary data structure based on the image-like input data structure and a pre-determined processing operation comprising the following steps as repeated processing steps in a plurality of iterations:
determining an image-like temporary data structure of a present iteration based on an image-like updated temporary data structure of a previous iteration and the pre-determined processing operation;
replacing data points of the image-like temporary data structure of the present iteration corresponding to the plurality of reference data points by the plurality of reference data points to a latest image-like updated temporary data structure; and
determining whether a time available for determining an image-like output data structure meets a stop criterion;
stop the repeated processing steps in response to determining that the time available for determining the image-like output data structure meets the stop criterion;
responsive to stopping the repeated processing steps, determine the image-like output data structure based on the image-like updated temporary data structure;
determine interpolated data based on the latest image-like output data structure; and
determine the map of the surrounding of the vehicle based on the interpolated data.

12. The computer system of claim 11, wherein the image-like input data structure is determined based on a camera plane projection of the distance-related data.

13. The computer system of claim 11, wherein the one or more processors are further configured to determine intermediate data based on an artificial neural network and based on the interpolated data, the map of the surrounding of the vehicle being determined based on the intermediate data.

14. The computer system of claim 13, wherein the one or more processors are further configured to acquire an image related to the surrounding of the vehicle, the intermediate data being determined based on the image.

15. The computer system of claim 11, wherein:
the image-like input data structure is a sparse image-like input data structure; and
the reference data points are data points explicitly provided in the sparse image-like input data structure.

16. The computer system of claim 11, wherein the stop criterion is further based on at least one of a number of iterations in the repeated processing steps or an accuracy of the image-like output data structure.

* * * * *